United States Patent [19]
Williamson

[11] Patent Number: 4,792,710
[45] Date of Patent: Dec. 20, 1988

[54] CONSTRUCTION OF ELECTRICAL MACHINES

[75] Inventor: Stephen Williamson, Tilehurst, England

[73] Assignee: National Research Development Corporation, London, England

[21] Appl. No.: 17,074

[22] Filed: Feb. 20, 1987

[30] Foreign Application Priority Data

Feb. 20, 1986 [GB] United Kingdom ............... 8604221

[51] Int. Cl.$^4$ .............................................. H02K 5/16
[52] U.S. Cl. ..................................... 310/90.5; 310/184
[58] Field of Search .................... 310/90.5, 179–181, 310/184–190, 195, 198, 200

[56] References Cited

U.S. PATENT DOCUMENTS

| | | | |
|---|---|---|---|
| 3,694,041 | 4/1972 | Studer | 310/90.5 |
| 4,121,143 | 10/1978 | Haberman et al. | 310/90.5 |
| 4,154,489 | 5/1979 | Lyman | 310/90.5 |
| 4,245,869 | 1/1981 | Scheffer et al. | 310/90.5 |
| 4,500,142 | 2/1985 | Brunet | 310/90.5 |
| 4,532,458 | 7/1985 | Kuznetsov et al. | |
| 4,597,613 | 7/1986 | Sudo | 310/90.5 |

FOREIGN PATENT DOCUMENTS

| | | |
|---|---|---|
| 2064229 | 6/1981 | United Kingdom . |
| 2084821 | 4/1982 | United Kingdom . |
| 2135835 | 9/1984 | United Kingdom . |

OTHER PUBLICATIONS

Say, M. G., Introduction to the Unified Theory of Electromagnetic Machines, "Magnetic Field Energy and Forces", pp. 40–43.

Primary Examiner—Mark O. Budd
Attorney, Agent, or Firm—Cushman, Darby & Cushman

[57] ABSTRACT

A polyphase cylindrical electrical machine including a non-salient stator, a rotor and an air-gap therebetween, together with a winding energisable to apply alternating current to exert two magnetic fields to rotate about the machine axis to produce a non-rotating force in a selected direction radially of the machine axis, the fields rotating in the same direction and having pole numbers differing by two, the fields being exerted by said current at one frequency to act on the machine rotor with said non-rotating force.

13 Claims, 4 Drawing Sheets $$F = \frac{1}{2\mu_0} B^2 \, N/m^2 \quad \cdots 1$$

$$F = \frac{1}{2\mu_0} \left\{ \hat{B}_1 \cos(\omega_1 t + p_1 \theta) + \hat{B}_2 \cos(\omega_2 t + p_2 \theta) \right\}^2 \quad \cdots 2$$

$$F = \frac{1}{2\mu_0} \left\{ \left( \frac{\hat{B}_1^2}{2} + \frac{\hat{B}_2^2}{2} \right) + \frac{\hat{B}_1^2}{2} \cos 2(\omega_1 t + p_1 \theta) + \frac{\hat{B}_2^2}{2} \cos 2(\omega_2 t + p_2 \theta) \right.$$
$$\left. + \frac{\hat{B}_1 \hat{B}_2}{2} \left[ \cos\left[(\omega_1 + \omega_2)t + (p_1 + p_2)\theta\right] + \cos\left[(\omega_1 - \omega_2)t + (p_1 - p_2)\theta\right] \right] \right\} \quad \cdots 3$$

Fig. 1

| Auxiliary winding voltage 40V | Speed (rpm) | Main Winding Voltage | | |
|---|---|---|---|---|
| | | 240V | 220V | 200V |
| | 1455 | 128 | 138 | 146 |
| | 1450 | 128 | 139 | 150 |
| | 1445 | 130 | 140 | 153 |
| | Vertical Force (N) | | | |

Fig. 2

CONSTRUCTION OF ELECTRICAL MACHINES

This invention relates to the construction of electrical machines.

Electrical machines conventionally have the form of fixed, generally tubular, part inside which is rotated a generally cylindrical part. The fixed part is often called the stator and the rotated part the rotor and these terms will be used herein for convenience. The clearance between the inner surface of the stator and the outer surface of the rotor is usually very small to avoid including too much of an air-gap in the magnetic flux path between the stator and the rotor. Accordingly the precision and durability of the bearings for the rotor is very important for the long reliable life expected of electrical machines. As the length of the rotor increases it is more difficult to increase stiffness to avoid flexing as if the diameter is made too large the bursting stresses are unsupportable.

It is an object of the invention to provide an electrical machine construction in which the rotor support is improved.

According to the invention there is provided a polyphase cylindrical electrical machine including anon-salient stator, a rotor and an air-gap therebetween, together with a winding energisable to apply alternating current to exert at least two magnetic fields to rotate about the machine axis to provide a non-rotating force in a selected direction radially of the machine axis, the field rotating in the same direction and having pole numbers differing by two, the fields being exerted by said current at one frequency to act on the machine rotor with said non-rotating force.

Conveniently the fields are produced by separate windings around the stator. One field may be much weaker than the other field. One field may be a main field of the machine. Both fields may have pole numbers differing from the main field. If the main field has a pole number M there may be another field of pole number $(M+2)$ or $(M-2)$. If the main field has a pole number M the other field may have pole numbers N and $(N \pm 2)$.

The rotor may be wound or of cage construction. The machine may be brushless or provided with rotor connection brushes.

The machine axis may be vertical and the non-rotating force introduced mechanical loading of a bearing of the machine.

The machine axis may be horizontal and the non-rotating force applied to support at least part of the weight of the rotor.

The machine may be a motor or a generator.

According to the invention there is also provided an electrical machine having in operation in a stator-rotor air-gap magnetic field of $$\hat{B}_1 \cos(wt + p_1\theta) \text{ and } \hat{B}_2 \cos(wt + p_2\theta)$$

in which $p_1 - p_2 = \pm 1$ and a steady force is exerted on the rotor in the radial direction.

The machine may be arranged to exert the steady force when at rest and/or during steady-state and/or run-up operation. In particular a machine may be arranged to have a specific winding or windings selectively operable to exert said force during run-up and other windings, which may include some of such specific winding or windings, selectively operable to exert said force during steady-state operation.

Steady-state operation refers to operation at or near synchronous speed while run-up refers to operation between rest and steady-state.

Embodiments of the invention will now be described with reference to the accompanying drawings in which:

FIG. 1 shows equations useful in the description of the invention and

FIG. 2 shows the variation of the vertical stationary force with main winding voltage at constant auxiliary winding voltage (40 V) and FIG. 3 shows section through a conventional prior art induction machine.

As mentioned above electrical machines can be formed from a non-salient stator inside which a cylindrical rotor rotates, spaced by an air-gap.

Figure 3:
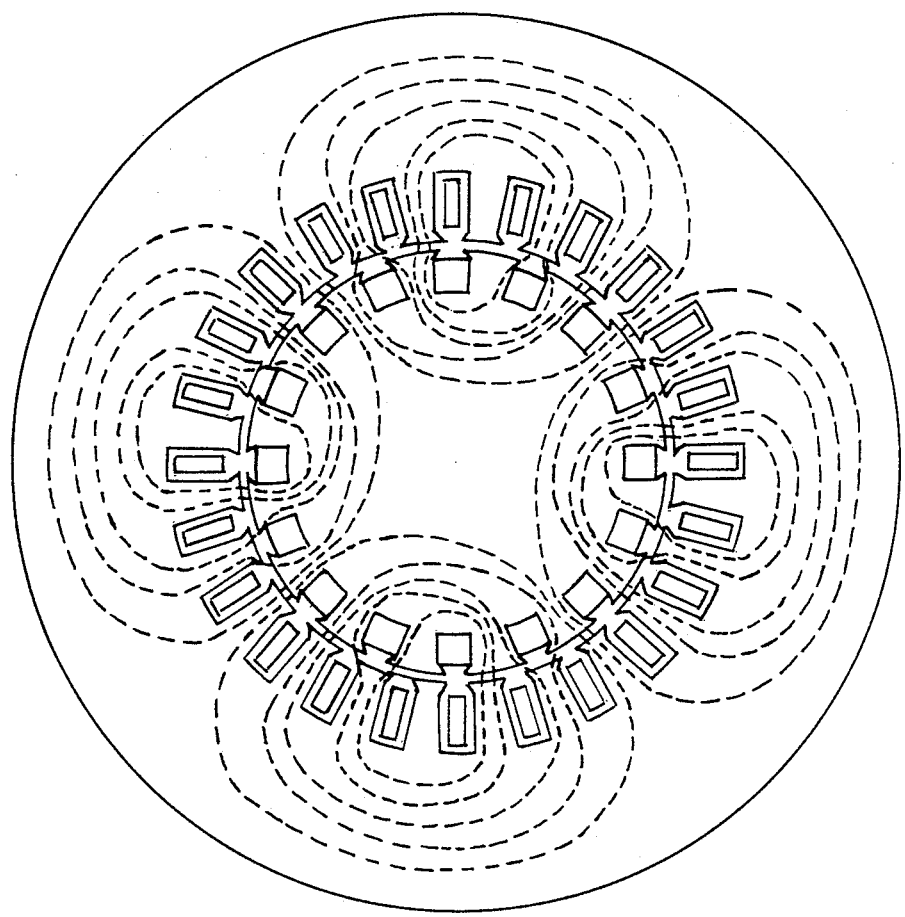

FIG. 3 shows a typical four pole induction machine with a wound stator and cage rotor. The stator has a winding of turns of conductor placed in slots (24 in this example) in the stator. The rotor "winding" is of bars of conductor in slots (16 in this example) in the rotor. Radially-directed fields from the four poles are indicted by the dotted lines, which represent an instantaneous position. The stator winding is arranged in well known manner for energisation from a balanced three-phase alternating electrical supply and, in operation as a motor, produces in the air gap a magnetic field rotating along the air gap at a speed related to the alternation of the supply, which field causes the rotor to rotate and drive a connected loan. The form of the winding is readily determined by one skilled in the electrical machine art with regard to the duty for a particular machine It is known non-uniform magnetic fields can be produce around part only of in the stator-rotor gap of an electrical machine and that these fields can be manipulated to control the machine e.g. speed control. Examples are UKPS Nos. 2135835, 2084821 (also USPS at. No. 4,532,458) and 2064229.

It has now been found, and established by analysis of machine behaviour, that two conventional windings arranged to produce two respective fields of a particular relationship can produce a non-pulsating force in a specific radial direction in addition to the usual rotary action. This force can be applied as required but it is especially useful in supporting the weight of the rotor during operation of the machine. Another use is in a vertical axis machine to apply a load to a bearing by providing stability in the vertical axis, that is by applying a sideways load.

The winding arrangement must be such that in a polyphase machine which has means for producing a main synchronously-rotating field in the air-gap there are also means for producing a second synchronously-rotating field which rotates in the same sense as the main field, has the same field frequency and has a pole number differing by two from the main field. The second field is generally smaller and sometimes much smaller than the main field, having values which could be as low as one hundredth of the main field.

The second filed can have a lower or a high pole number. In cage induction machines a lower pole number second field could be better for the torque/speed characteristic but clearly this can not always be done, e.g. for a two-pole machine, or be advisable, e.g. increased stator losses through increased end winding length. In synchronous and wound-rotor induction machines a high pole number second field is likely to minimise stator loss. Clearly in each case the various gains and losses must be assessed, as is usual and will be understood by those skilled in this art.

For example consider a polyphase induction machine in which two distinct stator windings are used, the main one a two-pole winding and the further one a four-pole winding. The windings are of the conventional type for the intended use of the machine and can be distributed around the whole periphery of the machine. The rotor is a conventional cage rotor. As the windings are conventional no special difficulties are involved. The relative strengths of the fields from the windings have to be determined however, as does the position around the stator at which the steady force is required. From a calculation based on a typical large induction motor (say 100 kW) $\hat{B}_2$, the peak value of the further field, can be one-tenth or less of $\hat{B}_1$, the peak value of the main field, and result in sufficient force to support most of the weight of the rotor.

A computer program can be used to calculate the position of the stationary force for a particular displacement between the main and further fields. By use of such a program for various values of displacement the displacement for a required position of the stationary force can be determined.

By way of example the application of the technique to a conventional motor will be described.

A conventional 11 kW induction motor having 48 stator slots was used. The design details of the machine were known so the effects of the application of the technique could be assessed.

The stator was rewound to provide a main and an auxiliary winding. The main winding was 4-pole, double-layer, fully pitched, 14 turns per coil each of 4 strands, 0.8 millimetre wire.

The auxiliary winding was 2-pole, double-layer, chorded by $\frac{1}{3}$, 10 turns per coil of single strand, 0/67 millimeter wire.

The ratio of auxiliary/main cross-sectional areas was 0.125 so the auxiliary winding occupied approximately 11% of the available slot area. The copper in each slot was increased by 9.6% compared to the original. The current density predicted in the original design was 5.88 amps/square millimetre at full load. This became 5.80 amps/square millimetre in the main winding and 6.75 amps/square millimetre the auxiliary winding. Both windings were fully-distributed around the air gap, the main winding being put in the slots before the auxiliary one so that the latter was nearest to the air gap. Both windings were of standard form. Those well versed in the art will understand how a balanced three-phase winding energized from a balanced three-phase supply will produce a rotating field in the air gap directed radially of the rotor and of a pole-number dependent upon the winding form.

The rewound motor had a slightly lower input power, slightly higher losses and a reduced torque compared with the design predictions of the original motor. The higher losses were due in part to the auxiliary winding energisation, which requires some 170 watts. Some derating may be required to cope with increased heating due to losses in the machine.

The force exerted on the rotor by the stationary force was 128 Newtons at 1450 rpm and design (240 V) supply voltage on the main winding. This was less (only some 75%) than the intended amount. As the stationary force rose towards the design value as the main winding voltage was reduced magnetic saturation is believed to be the cause of the shortfall. Nonetheless the 128 Newton force was enough to support 80% of the rotor weight. FIG. 2 shows the result of this test. On varying the auxiliary winding voltage (kept at 40 volts for the test results in FIG. 2 at constant main winding voltage) the stationary force varied in the expected linear manner. As in some cases bearings can be damaged if run totally unloaded (e.g. rotor wholly supported) less than total support is still very useful. Even as little as 10% support is helpful in some situations.

Figure 4:
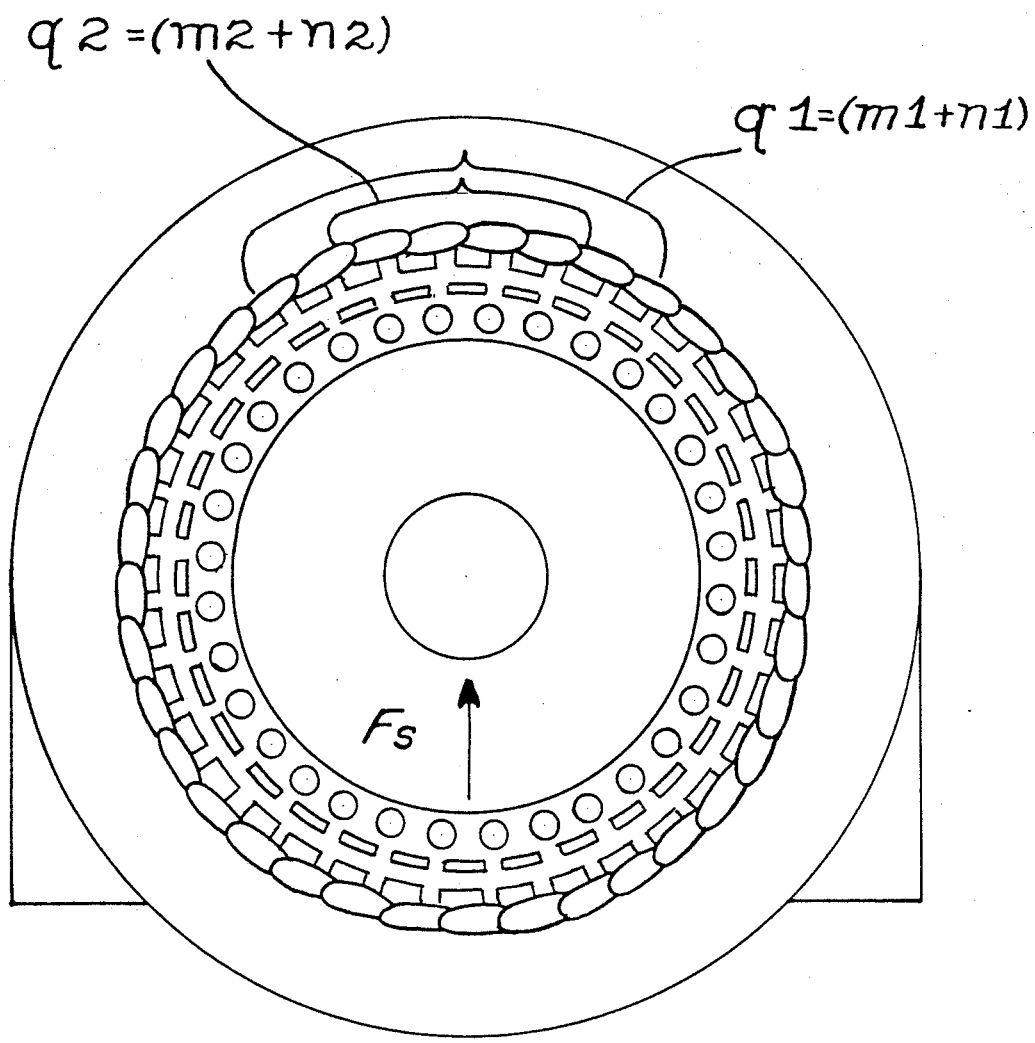
FIG. 4 shows an induction machine with a position for a force generated in accordance with the invention.

Another approach will now be described in the specific case of a machine having two similary-connected, separate, three-phase windings (i.e. both star or both delta). Each winding is of standard construction, as normally used in a commercial induction machine. Similar connection is required so that coils in both windings can be correctly stated to belong to the same phase. On the basis that a winding has m slots per pole and phase and is short-pitched by n slots then sets of (m+n) adjacent slots can be identified which carry at least one coil side belonging to the same phase. The term "phase group" will be used for such a set of (m+n) slots. Provided n>0 the phase groups will overlap for conventional three-phase windings. In the specific example of a double-wound stator machine the phase groups in one winding will have $q1=m1+n1$ slots while those in the other winding will have $q2=m2+n2$ slots. If q1 and q2 are both odd or both even then there will exist a single point around the machine which corresponds to the centre of phase groups of the same phase in *both* windings. This point defines the radial direction in which the stationary force Fs (see FIG. 4) will act. If however one of q1 and q2 is odd and the other even then the above coincidence of the phase group centres can not exist. Instead there will be two positions at which the centre line of a phase group of the main winding is one-half of a stator slot-pitch away from, the centre line of a phase group of the other winding of the same phase. The radial direction of the stationary force is then midway between these two positions.

In addition to the above arrangements other embodiments are possible. In very large machines, such as are used for turbo-alternators, the rotor length is the only dimension that it is practicable to increase to increase the power of the machine. A long unsupported rotor is the result. By suitable windings, which can be of very low power compared with the machine rating, a rotor can be supported even when the machine is not in use and thus preserve or relieve the bearings and avoid a permanent "set" of the rotor. Also the technique can be applied to other than induction machines, for example to a synchronous machine. In particular with such machines support for the rotor during run-up to synchronism can be provided by suitable winding arrangements which may be switched off when synchronism is reached.

The windings referred to above may be separate windings or parts of windings or any other convenient arrangement to produce the required fields during the particular state of operation of the machine.

The full analysis of the effect of the two fields is not given but in FIG. 1 of the drawings equation 1 is the expression for the radial stress, F, which acts outwards on the rotor surface for a flux of flux density B, in m.k.s. units. When B is composed of two fluxes, one from each winding described above, equation 2 applies. Equation 3 is the expansion of equation 2 and shows that when both fields have the same frequency of field intensity i.e. $w_1=w_2$ a non-pulsating component having a coefficient $(p_1-p_2)$ 0 exists. When $p_1$ and $p_2$ differ by $\pm 1$, e.g. a two-pole and a four-pole field or a ten-pole and a twelve-pole field, a single non-pulsating component arises and the angle of this can be set during design and construction of the machine to provide rotor support.

In the above examples one of the fields is generally the main field of the machine. However other arrangements are possible. Two fields whose pole numbers are both different from that of the main field may be used. For example a four-pole main field can have two-pole and six-pole associated fields, each of which can give rise to a non-rotating force in a selected direction. In another example a four-pole main field can have associated fields of, say, 30 and 32 poles. These associated fields have the required pole number difference of 2 to produce a non-rotating force but neither is the main fields. In some cases such distinct associated fields may have design or performance advantages, e.g. slot-filling or harmonic level. These arrangements may be combined thus on 8/10, 30/32 pole machine could be an example of the invention.

The techniques described above by way of example permit the construction of machines which have a radial force stationary in the reference frame of the fields which produce the radial force. In one application the dead weight of the rotor can be supported to a required degree when the rotor is at rest or in use.

I claim:

1. A polyphase cylindrical electrical machine including a non-salient stator, a rotor and an air-gap therebetween, together with a winding energisable to apply alternating current to exert at least two magnetic fields to rotate about the machine axis to provide a non-rotating force in a selected direction radially of the machine axis, the fields rotating in the same direction and having pole numbers differing by two, the fields being exerted by said current at one frequency to act directly and radially on the machine rotor with said non-rotating force.

2. A machine according to claim 1 in which one field is a main field of the machine.

3. A machine according to claim 2 in which the main field has a pole number M and there is another filed of pole number selected from $(M+2)$ and $(M-2)$.

4. A machine according to claim 1 in which both fields have pole numbers differing from that of the main field.

5. A machine according to claim 4 in which the main field has a pole number M and the other fields have pole numbers N and $(N+2)$ where N and M are unequal.

6. A machine according to claim 1 including separate windings around the stator to produce respective said fields.

7. A machine according to claim 1 including a suitably arranged single winding to produce said fields.

8. A machine according to claim 1 in which one field is much weaker than the other field.

9. A machine according to claim 1 in which said axis is vertical in use and in which the non-rotating force applies mechanical loading to a bearing of the machine.

10. A machine according to claim 1 in which said axis is horizontal in use and in which the non-rotating force supports at least part of the weight of the rotor.

11. A method of operating an electrical machine including providing in a stator-rotor air-gap in operation magnetic fields of $$\hat{B}_1 \cos(wt+p_1\theta) \text{ and } \hat{B}_2 \cos(wt+p_2\theta)$$

in which $p_1-p_2=\pm 1$ and a steady force is exerted on the rotor in the radial direction.

12. A method according to claim 11 including exerting the steady force in at least one of the rest and steady-state and run-up conditions.

13. A method according to claim 11 including providing a specific winding or windings selectively operable to exert said force during run-up and other windings, which may include some of such specific winding or windings, selectively operable to exert said force during steady-state operation.

* * * * *